United States Patent [19]

Schwer

[11] 4,447,265

[45] May 8, 1984

[54] METHOD AND COMPOSITION FOR FOAMING SLAG IN ELECTRIC ARC FURNACE

[76] Inventor: John W. Schwer, 1349 Azalea Dr., Munster, Ind. 46321

[21] Appl. No.: 507,767

[22] Filed: Jun. 27, 1983

[51] Int. Cl.³ .......................... C21C 7/00; C22B 9/10
[52] U.S. Cl. .......................................... 75/257; 75/53
[58] Field of Search ............................ 75/257, 51–58, 75/10–12

[56] References Cited

U.S. PATENT DOCUMENTS 4,225,347  9/1980  Diskowski ........................... 75/257
4,248,631  2/1981  More ..................................... 75/257

*Primary Examiner*—Peter D. Rosenberg
*Attorney, Agent, or Firm*—Jones, Day, Reavis & Pogue

[57] ABSTRACT

A slag-foaming composition and process for use in electric arc furnace steelmaking. The compositions comprise from about 15 to 80 wt % of a carbon source, the remainder consisting substantially of a source of an oxide of calcium; alternatively, the compositions comprise from about 15 to 30 wt % of a carbon source, the remainder consisting substantially of dolomite lime. The process consists of the addition, in the course of steelmaking using an electric arc furnace, of the steelmaking additive compositions of the invention to the charge subsequent to the initial scrap steel melt down.

10 Claims, No Drawings

METHOD AND COMPOSITION FOR FOAMING SLAG IN ELECTRIC ARC FURNACE

BACKGROUND OF THE INVENTION

1. Field of the Invention

The invention relates to steelmaking, particularly to additive compositions for use during steelmaking in electric arc furnaces.

2. Description of the Prior Art

The use of electric arc furnaces in steelmaking is a technique well-known to those skilled in the steelmaking art. Basically, the electric arc process differs from other steelmaking processes in its use of scrap steel as most of the charge. The scrap is added to the furnace at the beginning of the process cycle and melted down by the passage of electric current through the furnace's graphite electrodes, prior to the addition of the other components of the charge. A slag is formed on the surface of the charge during the initial melt-down, which remains during the entire process cycle until tapping of the heat.

Control of the rate of consumption of the graphite electrodes during the course of the process is an important part of electric arc furnace steelmaking. Minimizing electrode oxidation is a factor in controlling electrode consumption, as is maximizing the length of the arc between electrodes. Short electrode arcs give rise to a number of problems, including undesired splattering of the steelmaking charge about the vessel, rapid oxidation of the electrodes, and the inability to attain and/or maintain the high temperatures necessary to convert the charge to steel in the required cycle time.

Avoidance of these problems has been attempted through the use of a variety of methods known to those skilled in the steelmaking arts. None of these known techniques, however, has satisfied the need in electric arc furnace steelmaking to simultaneously reduce charge splattering, minimize electrode oxidation and consumption and maintain the desired high temperatures for time-efficient steelmaking without corroding the refractory of the furnace and/or ladle.

SUMMARY OF THE INVENTION

The foregoing shortcomings of the known electric arc furnace steelmaking techniques are alleviated by the use of the compositions and method of the present invention, which provide a foamy, non-corrosive slag enabling the steelmaker to use longer electrode arcs and, by burying those arcs in the foamed slag, reduce or eliminate splatter of the steelmaking charge while minimizing electrode oxidation and consumption and maintaining high temperatures.

The novel compositions of the invention comprise from about 15 to about 80 wt% of a carbon source, the remainder consisting substantially of a source of an oxide of calcium. The source of an oxide of calcium which may be used includes standard lime (95 wt% CaO), dolomitic lime (approximately 58 wt% CaO, 42 wt% MgO) and mixtures thereof, as well as other calcium oxide sources known in the steelmaking art. Either lime may be utilized in calcined or hydrated form, calcined being preferred. The carbon source which may be used includes carbon, petroleum coke, graphite, anthracite coal and mixtures thereof, as well as other carbon sources known in the steelmaking art.

Raw materials for the novel compositions of the invention include standard compounds of acceptable quality and purity to the steelmaking industry.

The process of the invention comprises the forming of foam in the slag during the period in electric arc furnace steelmaking between initial melt down of the steel scrap charge and the tapping of the heat by the addition of an effective amount of the novel compositions of the invention. The compositions of the invention may be added to the slag by injection, through a chute or hopper, by manually feeding by shovel or bag, as part of the last charge, or by any other method which brings the composition in contact with the slag during the steelmaking cycle.

An "effective amount" of the composition of the invention is that necessary to produce the desired degree of slag foaming. Sufficient foam should be generated through addition of the novel composition of the invention to completely cover or bury the electrode arc in the slag. An initial quantity of the composition may be added, the level of foam generated as a result observed, and a further quantity of the composition added to increase that level. Further quantities of the composition may be added during the course of the heat as needed to maintain the foam level.

The compositions of the invention also provide additional benefits to the electric arc furnace steelmaker. The foamed slag effects a flushing action which removes sulfur and phosphorous from the charge, thereby improving the steel quality. The slag is also rendered less corrosive or deleterious to the refractory linings of the furnace and ladle by the addition of the composition, which increases refractory life and reduces the cost of refractory replacement by that increase in life. Finally, the compositions may also include an oxygen source which enhances foam generation without diminishing the foregoing beneficial properties of the composition.

Accordingly, it is an objection of this invention to provide novel electric arc furnace slag foaming compositions and process which provide a foamy, non-corrosive slag.

It is a further object of this invention to provide novel electric arc furnace slag foaming compositions and process which enables the steelmaker to use longer electrode arcs and, by burying the arc in the foamed slag, reduce or eliminate splatter of the steelmaking charge while minimizing electrode oxidation and consumption without loss of the ability to maintain high temperatures and short process cycle duration.

It is yet another object of this invention to provide novel electric arc furnace slag foaming compositions and process which provides a foamed slag which effects a flushing action which removes sulfur and phosphorous from the charge, thereby improving the steel quality, yet which is less corrosive or deleterious to the refractory linings of the furnace and ladle than the untreated slag, aiding the maintenance of rapid heat time without damage to the furnace.

Other objects and advantages of this invention will become apparent upon reading the following detailed description and appended claims.

DESCRIPTION OF THE PREFERRED EMBODIMENT

The preferred proportion of the compounds comprised within the composition of the invention is from about 15 to about 80 wt% of a carbon source, the remainder consisting substantially of a source of an oxide of calcium, the ratio of carbon source to the calcium oxide source being adjusted in view of the oxidation level of the slag prior to foaming. A particularly preferred composition of the invention comprises from about 15 to about 30 wt% of a carbon source, the remainder consisting substantially of a source of an oxide of calcium. The preferred compositions use straight lime (approximately 95 wt% CaO), most preferably calcined, as the calcium oxide source. An optimal composition of the invention also includes an oxygen source material, such as oxygen (introduced through a lance or by other techniques known in the steelmaking art), FeO or MnO, in an amount from about 5 to 40 wt%. The amount of oxygen source material may be varied to provide the desired slag foam level in the furnace.

Specific preferred compositions of the invention are the following:

| | |
|---|---|
| Carbon source | about 15 to 80 wt % |
| Straight lime | about 85 to 20 wt % |
| Oxygen source | optional |

Specific particularly preferred compositions of the invention are the following:

| | |
|---|---|
| Carbon source | about 15 to 30 wt % |
| Straight lime | about 85 to 70 wt % |
| Oxygen source | optional |

Optimal compositions of the invention are the following:

| | |
|---|---|
| Carbon source | about 20 to 25 wt % |
| Straight lime | about 80 to 75 wt % |
| Oxygen source | optional | particularly

| | |
|---|---|
| Carbon source | about 20 wt % |
| Straight lime | about 80 wt % |
| Oxygen source | optional |

The preferred processes of the invention comprise the addition of the preferred compositions to the electric arc furnace at a time subsequent to the initial melting of the steel scrap charge to the furnace and prior to the tapping of the heat. The preferred compositions may be directly added to the slag formed during the initial scrap melt or may be added with the remainder of the charge.

The preferred compositions of the invention may be used in combination with other known steelmaking additives and additive compositions, including fluxing materials, desulfurizing compounds, degassing compounds, and other such materials.

While particular embodiments of the invention, and the best mode contemplated by the inventor for carrying out the invention, have been shown, it will be understood, of course, that the invention is not limited thereto since modifications may be made by those skilled in the art, particularly in light of the foregoing teachings. It is therefore, contemplated by the appended claims to cover any such modifications as incorporate those features which constitute the essential features of these improvements within the true spirit and scope of the invention.

I claim:

1. A slag-foamimg composition for use in electric arc furnace steelmaking comprising from about 15 to about 80 wt% of a carbon source, the remainder consisting substantially of a source of an oxide of calcium.

2. The composition of claim 1 wherein said carbon source is selected from the group consisting of carbon, petroleum coke, graphite, anthracite coal and mixtures thereof.

3. The composition of claim 1 wherein said source of an oxide of calcium is selected from the group consisting of lime, dolomitic lime and mixtures thereof.

4. The composition of claim 1 further comprising at least 5 wt% of an oxygen source.

5. The composition of claim 4 wherein said oxygen source is FeO.

6. The composition of claim 1 wherein said carbon source comprises from about 15 to about 30 wt% of said composition.

7. A method of forming foam in the slag produced during electric arc furnace steelmaking comprising the addition to said slag of an effective amount of a composition comprising from about 15 to about 80 wt% of a carbon source, the remainder consisting substantially of a source of an oxide of calcium.

8. The method of claim 7 wherein said carbon source of said composition is selected from the group consisting of carbon, petroleum coke, graphite, anthracite coal and mixtures thereof.

9. The method of claim 7 wherein said source of an oxide of calcium is selected from the group consisting of lime, dolomitic lime and mixtures thereof.

10. The method of claim 7 wherein said carbon source comprises from about 15 to about 30 wt% of said composition.

* * * * *